United States Patent [19]

Larson

[11] Patent Number: 4,621,975
[45] Date of Patent: Nov. 11, 1986

[54] CENTRIFUGAL PUMP SEAL

[75] Inventor: James H. Larson, Andover, Minn.

[73] Assignee: Graco Inc., Minneapolis, Minn.

[21] Appl. No.: 664,528

[22] Filed: Oct. 25, 1984

[51] Int. Cl.⁴ .............................................. F01D 11/00
[52] U.S. Cl. .................................. 415/111; 415/110;
415/169 R; 415/170 A
[58] Field of Search ............... 415/110, 111, 112, 113,
415/169 R, 169 A, 170 R, 170 A, 171, 172 R,
173 R, 174, 199.1, 175, 176, 177, 116; 277/31,
24, 85, 87, 88, 89

[56] References Cited

U.S. PATENT DOCUMENTS

| | | | |
|---|---|---|---|
| 1,820,100 | 8/1931 | Thompson | 277/89 |
| 2,237,027 | 4/1941 | Dorer | 415/170 A |
| 2,375,085 | 5/1945 | Curtis | 415/169 R |
| 2,600,879 | 6/1952 | Karlberg | 277/89 |
| 2,770,477 | 11/1956 | Rankin | 277/87 |
| 3,194,492 | 7/1965 | Koffinke et al. | 415/170 A |
| 3,340,813 | 9/1967 | Keyes | 415/176 |
| 3,515,394 | 6/1970 | Stevens | 277/87 |
| 3,715,169 | 2/1973 | Molis | 415/170 A |
| 3,746,350 | 7/1973 | Mayer et al. | 415/169 A |
| 3,776,560 | 12/1973 | Wentworth, Jr. | 277/88 |
| 4,453,722 | 6/1984 | Swanson | 277/89 |

FOREIGN PATENT DOCUMENTS 1072033  12/1959  Fed. Rep. of Germany ........ 277/89

OTHER PUBLICATIONS

"Crown Imperial and Imperial Centrifugal Pump" 1983, Graco Inc.
"Mechanical Seal 676" Sealol, Inc.

Primary Examiner—Robert E. Garrett
Assistant Examiner—John Kwon
Attorney, Agent, or Firm—Paul L. Sjoquist

[57] ABSTRACT

A centrifugal pump seal for providing a liquid seal to a vertically oriented pump drive shaft, including a bellows seal fixedly attached to the drive shaft and having a rotatable sealing ring as a part thereof, mated to a fixed sealing ring held in a seal housing, and a seal chamber surrounding the bellows seal and shaft, for containing pump liquid, wherein the fixed and rotatable seal rings and a portion of the seal housing are exposed to liquid contact for cooling, including a recirculating bleed line for continuously replenishing the liquid in the seal chamber.

6 Claims, 5 Drawing Figures

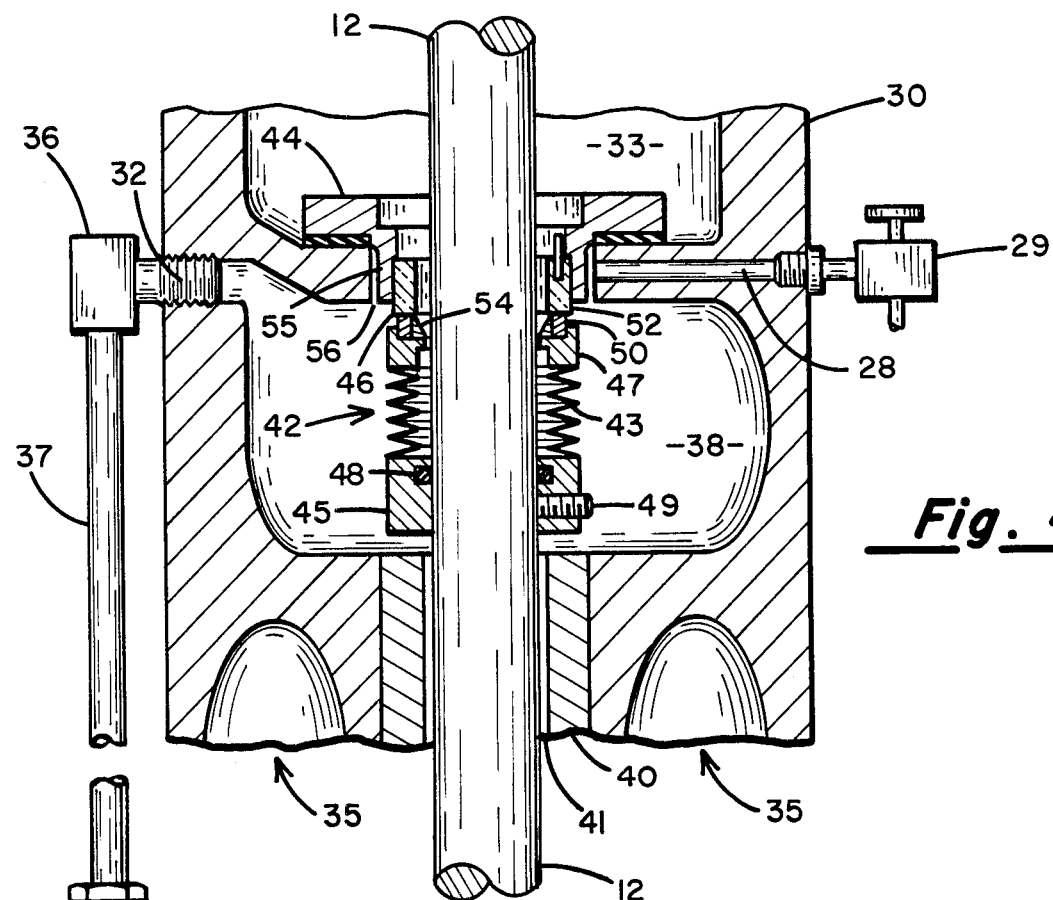
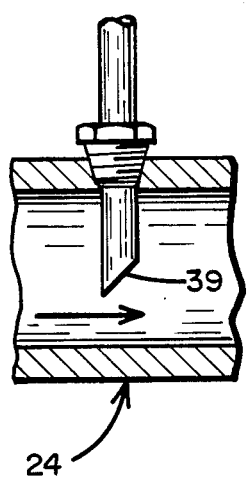
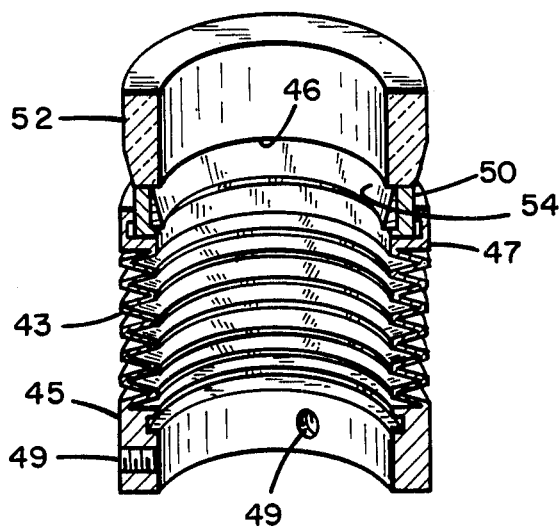
Fig. 4
Fig. 5

CENTRIFUGAL PUMP SEAL

BACKGROUND OF THE INVENTION

The present invention relates to centrifugal pumps, and more particularly to a novel seal for providing liquid flow isolation between the interior of the pump and the exterior through the pump shaft opening. The invention is primarily adaptable for use in connection with centrifugal pumps having a vertical drive shaft orientation, including one or more series-connected stages of pumping elements for developing elevated pressure and flow conditions.

The use of series-connected impeller pumps for developing increasing pressure levels is well-known in the art, including the use of such pumps in connection with a common drive shaft. One such pump is manufactured by the assignee of the present invention under the model name "Imperial" centrifugal pump, which utilizes from four to twelve impeller pumps ganged together on a single drive shaft and connected to an electrical drive motor. Each of the impeller stages are series-connected to provide successively increasing pressures and relatively high flow rates of viscous liquids. The impeller stages are assembled in stacked relationship on a pump stand, with a vertical drive shaft extending from the bottom stage through the topmost stage and terminating in a housing mounted on the pump stand above all of the stages. An electric drive motor is mounted on top the housing, and a mechanical coupling link is provided between the drive motor and the drive shaft. An inlet connection is provided into the bottom pumping stage, and internal passages couple successive stages together in series flow fashion. The topmost stage is fluid coupled into an outlet housing, and pumped liquid is delivered from this housing to various conduits.

In an industrial plant setting, a pump of the type described herein is typically placed near a large volume container which may hold paint, oils, or other liquid materials, and the pump outlet is connected to a conduit delivery system which may be piped over fairly long distances within the industrial plant. These pumping systems are typically operated over long periods of time, and may in certain instances be operated twenty-four hours per day indefinitely until a maintenance problem develops within the pump. The most typical maintenance problem is a leakage problem caused when the various shaft seals began to wear away, which initially results in a fairly small amount of leakage which builds-up over time until the leaking pump liquid accumulates over the area around the pump. When this occurs the pump delivery system must be shut down for maintenance and repair.

Since these pumps typically operate over long periods of time and are unattended, it is extremely important that a high degree of reliability be built into the pump. Since the most frequent maintenance problem arises out of leakage through shaft seals, great care is usually taken to design effective seals which will operate over extended time periods. The most frequent cause of shaft seal leakage results from over heating caused by friction, and it is therefore extremely important to design such seals to operate with as little frictional heat build-up as possible.

SUMMARY OF THE INVENTION

The present invention is an improvement in pump design to minimize frictional heat build-up in the vicinity of a pump shaft seal, and further to provide a shaft seal design which is not adversely affected by small accumulations of material resulting from a leakage and other factors, which would otherwise adversely accumulate to hinder the efficient operation of the seal.

The invention is particularly concerned with the design of a bellows seal and chamber for housing the bellows seal, wherein a portion of the pumped liquid is used as a cooling agent to carry away heat developed through the frictional contact necessarily present in such a seal. The bearing elements which comprise the bellows seal are housed within a seal chamber having liquid flow therein, and a maximum surface area of the bearing elements are exposed to the cooling effects of such liquid flow. Further, the contours of the bellows seal inner surfaces are shaped as to avoid accumulations of sediment build-up which would otherwise impair the sealing relationship.

It is therefore a principal object of the present invention to provide a shaft seal of the bellows type having a maximum surface area exposed in a sealing chamber for cooling sealing elements.

It is a further object of the present invention to provide a shaft seal having a smooth contour to prevent the build-up of sediment.

It is a further object of the present invention to provide a pump seal chamber for housing a shaft seal, and providing recirculating liquid flow through the chamber.

BRIEF DESCRIPTION OF THE DRAWINGS

The foregoing and other objects will become apparent from the appended specification and claims, and with reference to the drawings, in which:

FIG. 4 shows a expanded elevation view and cross section of a portion of the housing of FIG. 3; and FIG. 5 shows a cross section isometric view of a shaft seal.

DESCRIPTION OF THE DEFERRED EMBODIMENT

Figure 1:
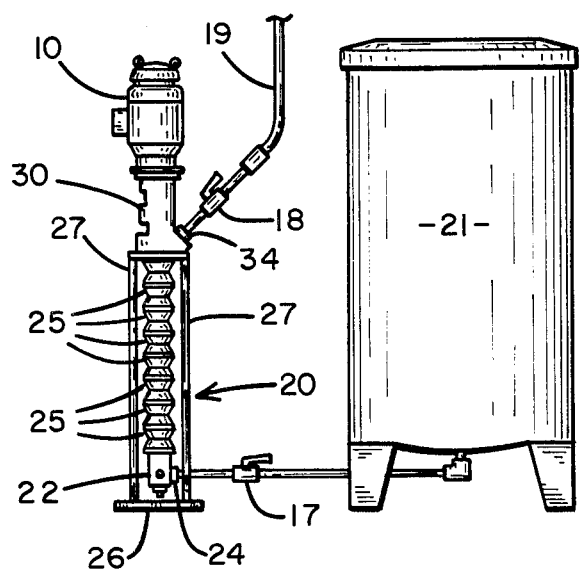
FIG. 1 shows a multistage centrifugal pump in typical operating use.

Referring first to FIG. 1, there is shown a multistage centrifugal pump 20 connected in a typical operating environment. Pump 20 has a plurality of impeller pump stages 25 which are stacked one on top of another on a mounting stand 26. Support rods 27 are attached to mounting stand 26, and an outlet housing 30 is supported by the support rods 27. An electric drive motor 10 is mounted to outlet housing 30 and is connected in driving relationship through a common drive shaft to all of the impeller pump stages 25. An intake bowl assembly 22 is mounted beneath the bottom most impeller pump stage 25, and is connected via a liquid inlet 24 to an inlet valve 17. Inlet valve 17 is connected through suitable conduits to a liquid reservoir 21 which typically contains a large volume of liquid for pumping.

A liquid outlet 34 is provided in outlet housing 30, for connection to an outlet valve 18. Outlet valve 18 is connected to a conduit 19 for delivery of the pumped liquid.

Figure 2:
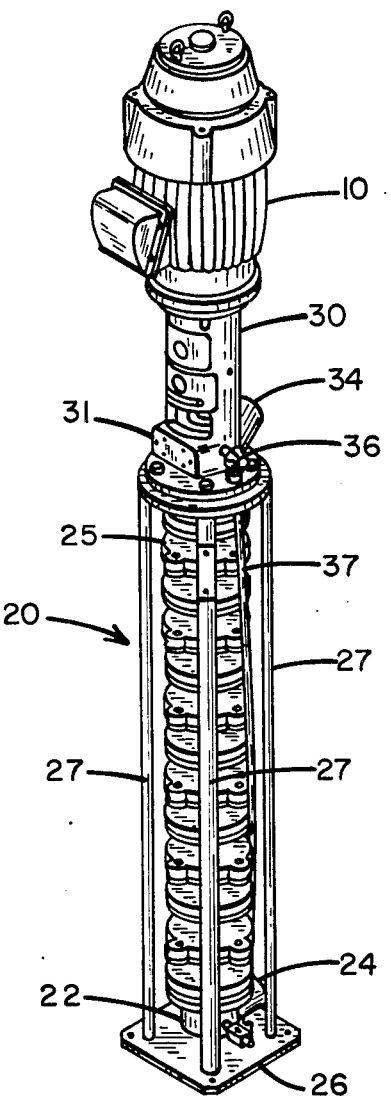
FIG. 2 shows a isometric view of the pump of FIG. 1.

FIG. 2 shows an isometric view of pump 20, illustrating that the impeller pump stages 25 are bolted together in series connection relationship, to form a series flow path from liquid inlet 24 to liquid outlet 34. A 90° elbow 36 and drain tube 37 are connected to outlet housing 30 and to liquid inlet 24 for purposes to be hereinafter described. Outlet housing 30 has a sealable service door 31 which provides access to the interior of outlet housing 30 for maintenance and service.

FIG. 2 shows twelve series-connected impeller pump stages 25 for purposes of illustration. In practical applications the number of impeller pump stages may vary over a considerable range, it being typical to connect from four to fourteen impeller pump stages together in particular pumping applications. The lengths of the respective support rods 27 may be varied to accommodate the number of impeller pumping stages which are connected together in this fashion, and the overall height of the pumping assembly and electric drive motor is a function of the number of series-connected stages.

Figure 3:
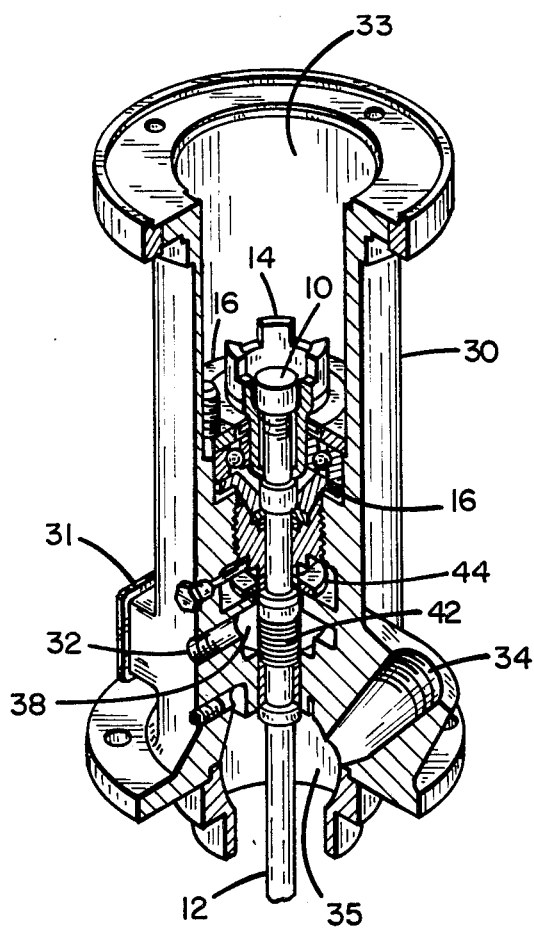
FIG. 3 shows a isometric view and partial cross section of the outlet housing.

FIG. 3 shows outlet housing 30 in isometric and partial cross section view. Outlet housing 30 is formed into an upper chamber 33 wherein the mechanical linkage between the motor shaft 10 and the impeller shaft 12 are coupled, a seal chamber 38 wherein the shaft liquid seal is housed, and a lower outlet chamber 35 through which the pumped liquid passes to liquid outlet 34. Impeller shaft 12 passes through a pressure throttle bushing 40 which is pressed into outlet housing 30. Impeller shaft 12 is further supported by a thrust bearing 16 which is adjacent a motor shaft coupler 14 in upper chamber 33.

A seal housing 44 is fixedly attached to outlet housing 30, and forms the upper wall of seal chamber 38. A bellows seal 42 is associated with seal housing 44 and is hereinafter described. Drain outlet 32 is threaded to accommodate a 90° elbow 36, and to provide a flow drain from seal chamber 38.

FIG. 4 shows an expanded cross sectional view of outlet housing 30, and particularly illustrates the components associated with seal chamber 38. Impeller shaft 12 passes entirely through seal chamber 38, and at the lower side of seal chamber 38 impeller shaft 12 passes through a pressure reducing throttle bushing 40. An annular path 41, shown in FIG. 4 in exaggerated fashion for purposes of illustration, provides a liquid flow path about impeller shaft 12 from outlet chamber 35 to seal chamber 38. Outlet chamber 35 is typically relatively highly pressurized, and therefore liquid may flow through annular path 41 at a reduced pressure upwardly into seal chamber 38. As seal chamber 38 fills with such liquid, there is provided a drain outlet 32 proximate the top of seal chamber 38. Drain outlet 32 is connected to the elbow 36, which in turn is coupled via a drain tube 37 downwardly into liquid inlet 24. An overflow adapter 39 projects into liquid inlet 24, adapter 39 having a tapered opening facing downstream of the liquid flow through liquid inlet 24, creating a negative pressure to assure drainage flow for cooling the components in seal chamber 38, which flow is illustrated by the arrow in FIG. 4. An air bleed opening 28 is provided near the top of chamber 38, and is connected externally to a bleed valve 29 (see FIG. 3). Bleed valve 29 may be selectively opened to bleed entrapped air from chamber 38, and thereby ensure that liquid entirely fills chamber 38.

A seal housing 44 is affixed to outlet housing 30, and has a downwardly projecting neck 55 facing toward seal chamber 38. Neck 55 has a reduced diameter lower portion so as to provide an annular gap 56 into seal chamber 38. A recessed shoulder is provided at the bottom of neck 55 for receiving a seal ring 52. Seal ring 52 is fixedly attached to seal housing 44 by means of a slot or key way which prevents relative rotation of seal ring 52 when it is seated in the receiving shoulder of neck 55. Seal ring 52 is preferably constructive of a carbon material, or of a tungsten carbide material, and has a polished lower seal face 46 which forms a liquid sealing surface.

A collar 45 is fixedly attached to impeller shaft 12 by means of one or more set screws 49. An O-ring 48 is contained between collar 45 and impeller shaft 12 to provide a liquid seal therebetween. Collar 45 is a part of a bellows seal 42, which is a commercially available component. For example, such bellows seals are manufactured by Sealol, Inc., of Warwick, R.I., in a number of commercially available sizes and constructions. Bellows seal 42 also includes a welded stainless steel bellows 43 and a seal seat 47. Bellows 43 is welded to collar 45 and to seal seat 47 so as to provide a completely liquid impervious interconnection. Seal seat 47 has a recessed shoulder for receiving a seal ring 50, and seal ring 50 is typically constructed of a carbon or other equivalent material for providing an effective mechanical seal which is reliable under a wide range of operating conditions. The upper surface of seal ring 50 is highly polished so as to mate against the corresponding lower surface of fixed seal ring 52, thereby to provide a seal face 46. An inner flange ring 54 is pressed fit inside of seal ring 50, so as to provide a tapered contour along the inner surface of the seal ring 50. Flange ring 54 is preferably made from nylon or equivalent material to provide a smooth facing surface toward the interior of the seal.

FIG. 5 shows a cross sectional isometric view of a bellows seal 42. The lower collar 45 has a plurality of threaded holes there through for accepting a plurality of set screws 49. A bellows 43 is welded about the periphery of collar 45 so as to provide a liquid type connection. Similarily, the top of bellows 43 is welded or otherwise affixed against seal seat 47 so as to provide a liquid type connection. Seal seat 47 has an inner shoulder for accepting a seal ring 50, and a flange ring 54 is pressed fit inside of seal ring 50 so as to provide a smoothly tapered surface along the inner periphery of seal ring 50. A further fixed seal ring 52 is mated against the upper surface of seal ring 50, to perform a smooth seal face 46 therebetween. Seal face 46 is preferably lapped and polished so as to provide a tight, liquid sealing contact between seal ring 50 and fixed seal ring 52.

In operation, since collar 45 is fixedly attached to shaft 12, there is relative rotation of seal ring 50 in coincidence with shaft 12. Fixed seal ring 52 is held in a non-moving position by seal housing 44, and there is therefore relative rotation of the two parts at seal face 46. Seal face 46 is preferably a matched interface of two very highly polished surfaces, and a careful selection of the materials for seal rings 52 and 50 is made, so as to provide both a liquid seal at face 46 and also to provide a low friction contact between the mating surfaces of seal rings 50 and 52. Since there is inevitably frictional heat build-up at this seal face 46, provision is made for liquid cooling of the components which are closely associated with seal face 46. For example, seal chamber 38 and air bleed valve 29 are constructed so as to permit pumped liquid which is forced upwardly through annular path 41 to accumulate to a level which completely fills chamber 38. This pumped liquid then bathes all of the components in seal chamber 38 with liquid, and drain outlet 32 provides a circulation outlet for draining the pumped liquid and recirculating it as it collects heat from the frictional losses. Seal housing neck 55 is of reduced diameter to provide an annular gap 56, which provides a cavity for bleeding entrapped air, and liquid within seal chamber 38 may flow into this gap for further cooling purposes. Further, a portion of seal rings 50 and 52 are exposed to the pump liquid contained within chamber 38 for transferring frictional heat losses into this liquid.

Over extended periods of operation, it is inevitable that small quantities of liquid will find a leakage path across seal face 46, and these small quantities of liquid will tend to accumulate inside of bellows seal 42, particularly in the region between shaft 12 and above collar 45. This liquid sediment eventually dries and takes the form of dry sediment deposits. In the past it has been found that such dry sediments deposits can build-up along the shoulder formed in seal seat 47, and eventually this sediment build-up can expand to the point where it causes a relative separating force between seal rings 50 and 52. Because of this problem flange ring 54 is pressed fit into the shoulder space of seal seat 47, to form a smooth contour which causes accumulated sediments to slide freely downwardly away from the region of seal face 46. Flange ring 54 is preferably made of nylon or other smooth plastic materials so as to facilitate the removal of sediment away from this critical interface.

Air bleed valve 29 may be adjusted so as to relieve entrapped air from chamber 38, and therefore to insure that chamber 38 remains completely filled at all times. The liquid which is by-passed through drain 36 is coupled back to the inlet 24 by means of drain tube 37. The lower end of drain tube 37 is formed into an overflow adapter 39, which is diagonally cut so as to provide some venturi suction effect for enhancing the liquid flow through drain tube 37.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for liquid sealing a vertically aligned pump shaft projecting externally of a pump chamber housing, comprising
   (a) a seal chamber formed adjacent and above said pump chamber, said seal chamber having an upper external opening through which said shaft projects and having a liquid flow outlet at least as high as the elevation of said external upper opening, said seal chamber having a lower external opening through which said shaft projects into said pump chamber housing, including means for permitting liquid flow from said pump chamber housing through said lower external opening into said seal chamber;
   (b) a seal housing sealably closing said upper external opening except for the region about said shaft, said seal housing having a narrowed neck spaced about said shaft and downwardly projecting into said upper external opening; thereby forming an annular gap between said neck and said upper external opening;
   (c) a bellows seal member sealably affixed to said shaft in said seal chamber and having an upwardly projecting shoulder in said seal chamber;
   (d) a first sealing ring affixed to said downwardly projecting neck, and having a downwardly facing smooth seal face in said seal chamber;
   (e) a second sealing ring seated in said upwardly projecting shoulder, and having an upwardly facing smooth seal face in said seal chamber and mated to said first sealing ring smooth seal face; whereby liquid in said seal chamber is in flow contact with said first and second sealing rings; and
   (f) a bleed passage having a first opening into said annular gap and a second opening external of said pump chamber housing, and a bleed valve connected to said second opening.

2. The apparatus of claim 1, further comprising a conduit connected to said liquid flow outlet.

3. The apparatus of claim 2, further comprising a flanged ring seated in said bellows seal member upwardly projecting shoulder, adjacent the inner circumference of said second sealing ring.

4. The apparatus of claim 3, wherein said flanged ring has an inner upper diameter proximately equal to the inside diameter of said first sealing ring, and has an inner lower diameter proximately equal to the inside diameter of said upwardly projecting shoulder.

5. The apparatus of claim 4, wherein said flanged ring is constructed of plastic material.

6. The apparatus of claim 5, wherein said seal chamber bleed passage first opening is at proximately the same elevation as said downwardly projecting neck.

* * * * *